US012156191B2

(12) United States Patent
Xiong et al.

(10) Patent No.: US 12,156,191 B2
(45) Date of Patent: Nov. 26, 2024

(54) METHOD AND DEVICE FOR UPLINK TRANSMISSION

(71) Applicant: Samsung Electronics Co., Ltd., Gyeonggi-do (KR)

(72) Inventors: Qi Xiong, Beijing (CN); Feifei Sun, Beijing (CN); Min Wu, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/393,845

(22) Filed: Aug. 4, 2021

(65) Prior Publication Data

US 2022/0046623 A1 Feb. 10, 2022

(30) Foreign Application Priority Data

Aug. 5, 2020 (CN) .......................... 202010779664.8
Oct. 23, 2020 (CN) .......................... 202011148323.7

(51) Int. Cl.
*H04W 72/04* (2023.01)
*H04L 1/1812* (2023.01)
*H04W 72/044* (2023.01)

(52) U.S. Cl.
CPC ......... *H04W 72/046* (2013.01); *H04L 1/1819* (2013.01)

(58) Field of Classification Search
CPC ........... H04W 72/046; H04W 72/0446; H04W 72/23; H04L 1/1819; H04L 1/08; H04L 1/189; H04L 1/1896
See application file for complete search history.

(56) References Cited

U.S. PATENT DOCUMENTS 10,601,551 B2  3/2020 Ying et al.
10,764,922 B2 * 9/2020 Kato ................. H04W 74/0833
(Continued)

FOREIGN PATENT DOCUMENTS

CN    110035536    7/2019
CN    110603765    12/2019
(Continued)

OTHER PUBLICATIONS

International Search Report dated Nov. 3, 2021 issued in counterpart application No. PCT/KR2021/010256, 8 pages.
(Continued)

*Primary Examiner* — Mahbubul Bar Chowdhury
(74) *Attorney, Agent, or Firm* — The Farrell Law Firm, P.C.

(57) ABSTRACT

A method and device are provided for determining resource configuration of uplink signal transmission. A method performed by a terminal in a wireless communication system includes receiving, from a base station, a first control message including first configuration information on msg3 repetition, second configuration information on UL or DL configuration, and third configuration information on an SSB; transmitting, to the base station, a random access preamble; receiving, from the base station, an RAR in response to the random access preamble; identifying a first resource for a repetition of a msg3 transmission based on the RAR and the first control message, wherein the first resource does not include a symbol indicated as a downlink by the second configuration information or a symbol indicated by the third configuration information to which the SSB is to be transmitted; and transmitting, to the base station, the msg3 on the identified first resource.

14 Claims, 12 Drawing Sheets

(56) References Cited

U.S. PATENT DOCUMENTS

| | | | |
|---|---|---|---|
| 11,083,001 | B2 | 8/2021 | Choi |
| 11,553,529 | B2 | 1/2023 | Xiong et al. |
| 11,855,782 | B2 | 12/2023 | Wang et al. |
| 2017/0346607 | A1* | 11/2017 | Chen .................... H04W 72/23 |
| 2018/0159656 | A1 | 6/2018 | Papasakellariou |
| 2018/0219649 | A1 | 8/2018 | Ying et al. |
| 2019/0215872 | A1* | 7/2019 | Park ................. H04W 52/0216 |
| 2019/0349116 | A1 | 11/2019 | Hosseini et al. |
| 2020/0052827 | A1 | 2/2020 | Vilaipornsawai et al. |
| 2020/0059390 | A1 | 2/2020 | Zhang et al. |
| 2020/0145998 | A1* | 5/2020 | Sun ...................... H04B 7/0617 |
| 2020/0162208 | A1* | 5/2020 | Moon ..................... H04L 1/189 |
| 2021/0036822 | A1* | 2/2021 | Lyu ......................... H04L 5/006 |
| 2021/0184819 | A1* | 6/2021 | Takeda ................. H04L 5/0044 |
| 2021/0226680 | A1* | 7/2021 | Khoshnevisan ..... H04B 7/0404 |
| 2021/0251016 | A1* | 8/2021 | Xiong ................ H04W 74/008 |
| 2021/0266955 | A1* | 8/2021 | Taherzadeh Boroujeni ................ H04B 7/0695 |
| 2021/0266978 | A1* | 8/2021 | Sakhnini ........... H04W 74/0833 |
| 2021/0392699 | A1* | 12/2021 | Park .................. H04W 74/0891 |
| 2022/0015149 | A1* | 1/2022 | Ly ....................... H04W 74/006 |
| 2022/0345271 | A1* | 10/2022 | Wu ......................... H04L 1/189 |
| 2022/0353698 | A1* | 11/2022 | Jang ....................... H04L 1/189 |
| 2022/0369379 | A1* | 11/2022 | Li ..................... H04W 74/0833 |
| 2022/0393823 | A1* | 12/2022 | Fan ....................... H04L 5/0048 |
| 2022/0400501 | A1* | 12/2022 | Kang ................... H04L 1/1893 |
| 2023/0053082 | A1* | 2/2023 | Cozzo ............... H04W 72/1268 |
| 2023/0085104 | A1* | 3/2023 | Park .................... H04W 74/008 370/329 |
| 2023/0125953 | A1* | 4/2023 | Hurd ..................... H04L 5/0053 370/329 |
| 2023/0188261 | A1* | 6/2023 | Awadin ................ H04L 1/1864 370/329 |
| 2023/0300891 | A1* | 9/2023 | Su ....................... H04W 74/002 370/329 |

FOREIGN PATENT DOCUMENTS

| | | |
|---|---|---|
| CN | 110958085 | 4/2020 |
| EP | 3 609 104 | 2/2020 |
| EP | 3799505 A1 * | 3/2021 |
| KR | 1020200016181 | 2/2020 |
| WO | WO 2019/216803 | 11/2019 |

OTHER PUBLICATIONS

Ericsson, "Random Access for Rel-13 Low Complexity and Enhanced Coverage UEs", R2-153717, 3GPP TSG-RAN WG2 #91, Aug. 24-28, 2015, 7 pages.

European Search Report dated Dec. 12, 2023 issued in counterpart application No. 21854321.3-1213, 10 pages.

Chinese Office Action dated Jul. 24, 2024 issued in counterpart application No. 202011148323.7, 8 pages.

* cited by examiner

METHOD AND DEVICE FOR UPLINK TRANSMISSION

CROSS-REFERENCE TO RELATED APPLICATION(S)

This application is based on and claims priority under 35 U.S.C. § 119(a) to Chinese Patent Application No. 202010779664.8, filed on Aug. 5, 2020, in the China National Intellectual Property Administration and Chinese Patent Application No. 202011148323.7, filed on Oct. 23, 2020, in the China National Intellectual Property Administration, the disclosure of each of which is incorporated herein by reference in its entirety.

BACKGROUND

1. Field

The present disclosure relates to the field of wireless communication, and more particularly, to a method and device for uplink signal transmission.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'beyond 4G network' or a 'post LTE System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

Aspects of the present disclosure are to address at least the above-mentioned problems and/or disadvantages, and to provide at least the advantages described below. Therefore, various aspects of the present disclosure provide a method and device for confirming the resource configuration of uplink signal transmission. The method and device for confirming the resource configuration of uplink signal transmission according to various aspects of the present disclosure can enable a user equipment (UE) to use multiple transmit beams to perform random access signals transmission in one uplink transmission procedure, and obtain repetitive signal transmission to achieve the effect of coverage enhancement and better beam management for multiple transmit beams.

According to an aspect of the present disclosure, a method performed by a terminal in a wireless communication system includes receiving, from a base station, configuration information for repetitive transmission of an uplink signal; and transmitting, to the base station, the repetitive transmission of the uplink signal based on the configuration information.

In the method, the configuration information may include at least one of a type of the repetitive transmission, determination of a redundancy version index in the repetitive transmission, or determination of transmission beam of the repetitive transmission.

Further, the type of the repetitive transmission may include at least one of: a first type, which configures the same physical uplink shared channel (PUSCH) repetitive transmission to be on each slot, a second type, which configures the PUSCH repetitive transmission to be consecutive, or a third type, which configures the terminal autonomously to determine a number of times of repetitions, transport block size (TBS), and modulation and coding scheme (MCS).

Further, the determination of the redundancy version index in the repetitive transmission is based on at least one of: for multiple PUSCH transmission repetitions in all PUSCH transmissions, using the same redundancy version; for multiple PUSCH transmission repetitions in a same PUSCH transmission, using the same redundancy version, and for PUSCH transmission repetitions in different PUSCH transmissions, using the redundancy version index in order; for multiple PUSCH transmission repetitions in a same PUSCH transmission, using the redundancy version index in order, and for PUSCH transmission repetitions in different PUSCH transmissions, using the same redundancy version;

or for multiple PUSCH transmissions repetitions in all PUSCH transmissions, using the redundancy version index in order.

Further, the determination of the transmission beam in the repetitive transmission is based on at least one of: for multiple PUSCH transmissions in all PUSCH transmissions, using the same transmission beam; for multiple PUSCH transmissions in a same PUSCH transmission, using the same transmission beam, and for different PUSCH transmissions, using different transmission beams; or for multiple PUSCH transmissions in a same PUSCH transmission, using different transmission beams, and for different PUSCH transmissions, using the same transmission beam.

According to an aspect of the present disclosure, a method performed by a base station in a wireless communication system includes transmitting, to a terminal, configuration information for repetitive transmission of an uplink signal; and receiving, from the base station, the repetitive transmission of the uplink signal based on the configuration information.

According to an aspect of the present disclosure, a user equipment (UE) includes a transceiver, to receive signals from a base station and transmit signals to the base station; a memory, to store executable instructions; and a processor, to execute stored instructions to perform the method described above.

According to an aspect of the present disclosure, a base station includes a transceiver, to receive signals from a user equipment (UE) and transmit signals to the UE; a memory, to store executable instructions; and a processor, to execute stored instructions to perform the method described above.

BRIEF DESCRIPTION OF THE DRAWINGS

The above and other objects, features, and advantages of the present disclosure will be more apparent from the following description of embodiments of the present disclosure with reference to the accompanying drawings, in which.

DETAILED DESCRIPTION

Figure 1:
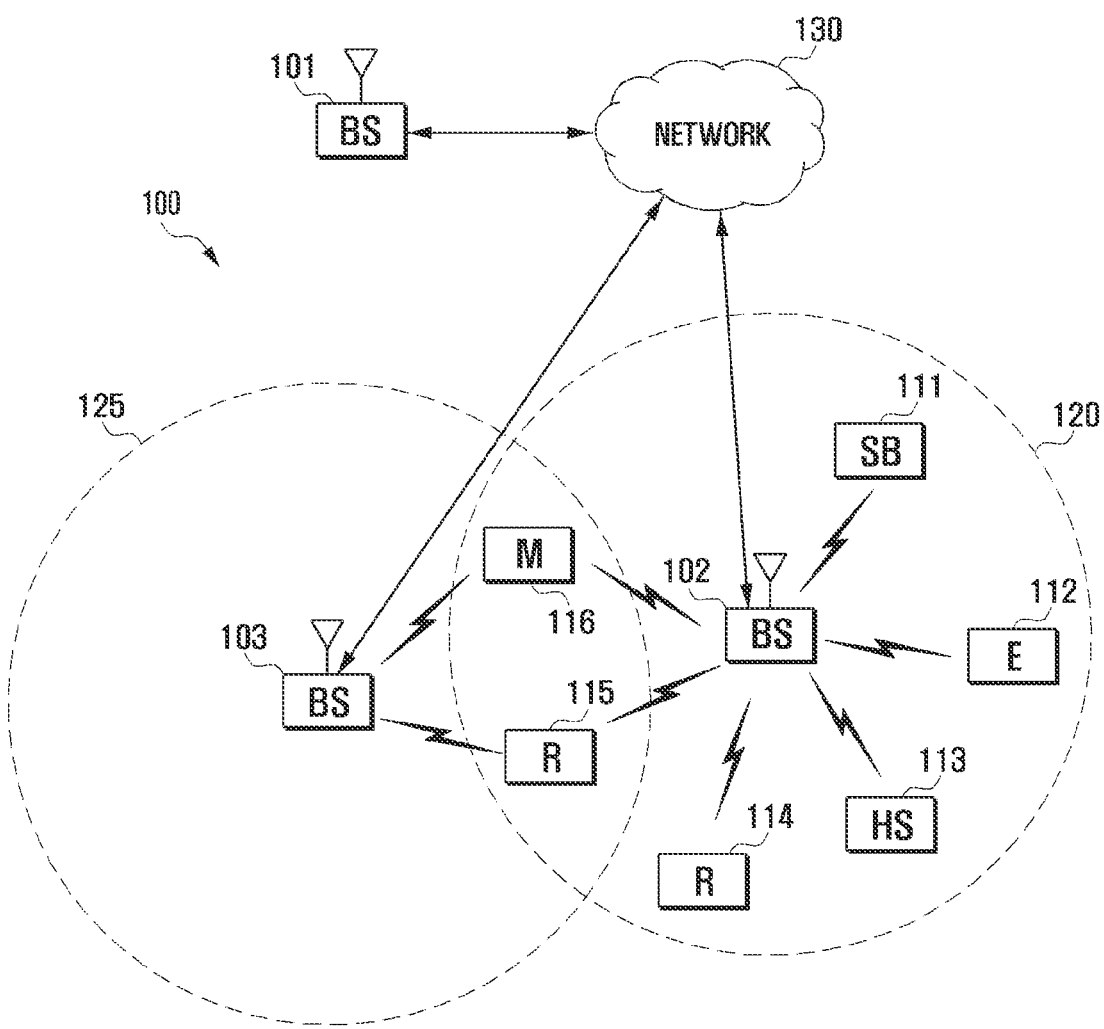
FIG. 1 illustrates an example wireless network according to an embodiment.

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

Those skilled in the art will understand that the singular forms "a", "an", "said" and "the" used herein may include plural forms, unless otherwise specified. It should be further understood that the term "include/comprise" used in the specification of the present disclosure refers to the existence of the described features, integers, steps, operations, elements and/or components, but does not exclude the existence or addition of one or more other features, integers, steps, operations, elements, components, and/or groups thereof. It should be understood that when an element is referred to as being "connected" or "coupled" to another element, it may be directly connected or coupled to the other element, or intervening elements may also be present. Furthermore, "connected" or "coupled" as used herein may include wirelessly connected or wirelessly coupled. As used herein, the term "and/or" includes all or any of the units and all combinations of one or more of the associated listed items.

Those skilled in the art will understand that, unless otherwise defined, all terms (including technical and scientific terms) used herein have the same meaning as generally understood by an ordinary person skilled in the art to which the present disclosure belongs. It should be further understood that such terms as those defined in a generally used dictionary are to be interpreted to have the same contextual meanings as normally understood in the relevant field of art, and are not to be interpreted to have ideal or excessively formal meanings unless clearly defined in the present specification.

Those skilled in the art will understand that "terminal" and "terminal device" used herein include both wireless signal receiver devices, which only have wireless signal receivers without transmission capability; and devices having receiver and transmitter hardware, which include receiver and transmitter hardware capable of performing bidirectional communication on a bidirectional communication link. Such devices may include cellular or other communication devices with single-line or multi-line displays, or cellular or other communication devices without multi-line displays; personal communications service (PCS), which may combine voice, data processing, fax and/or data communication capabilities; personal digital assistant (PDA), which may include radio frequency receivers, pagers, internet/intranet access, web browsers, notepads, calendars and/or global positioning system (GPS) receivers; conventional laptop and/or palmtop computer or other devices, which are conventional laptops and/or palmtop computers or other devices have and/or include a radio frequency receiver. "Terminal" and "terminal device" used herein may be portable, transportable, installed in transportation means (aircraft, ship, and/or vehicle), or suitable and/or configured for local operations, and/or operated in a distributed manner on any other location on Earth and/or in space. "Terminal" and "terminal device" used herein may also be communication terminals, Internet terminals, music/video playback terminals, such as PDA, mobile internet device (MID), and/or mobile phones with music/video playback function, and may also be smart TVs, set-top boxes and other devices.

Those skilled in the art can understand that the "base station" (BS) or "network device" used herein may refer to an eNB, eNodeB, NodeB, or a base transceiver station (BTS) or gNB, etc. according to the technology and terminology used.

Those skilled in the art can understand that the "memory" used herein may be of any type suitable for the technical environment herein, and may be implemented using any suitable data storage technology, including but not limited to, semiconductor-based storage devices, magnetic storage devices and systems, optical storage devices and systems, fixed and removable storages.

Those skilled in the art can understand that the "processor" used herein may be of any type suitable for the technical environment herein, including but not limited to, one or more of general purpose computers, special purpose computers, microprocessors, digital signal processors (DSPs), and multi-core-architectures based processors.

The time domain unit (also referred to as a time unit) in the present disclosure may be one OFDM symbol, a set of OFDM symbols (consisting of multiple OFDM symbols), one slot, a set of slots (consisting of multiple slots), one subframe, a set of subframes (consisting of multiple subframes), one system frame, a set of system frames (consisting of multiple system frames); and may also be an absolute time unit, such as 1 millisecond, 1 second, and the like. The time unit may also be a combination of multiple granularities, such as N1 slots plus N2 OFDM symbols.

The frequency domain unit in the present disclosure may be one subcarrier, one subcarrier group (consisting of multiple subcarriers), one resource block (RB), which may also be referred to as physical resource block (PRB), one resource block group (consisting of multiple RBs), one bandwidth part (BWP), one bandwidth part group (consisting of multiple BWPs), one band/carrier, and one band group/carrier group; and may also be absolute frequency domain units, such as 1 Hz, 1 kHz, and the like. The frequency domain unit may also be a combination of multiple granularities, such as M1 PRBs plus M2 subcarriers.

Hereinafter, embodiments according to the present disclosure will be described in detail with reference to the accompanying drawings.

FIG. 1 illustrates an example wireless network 100 according to an embodiment. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this document to refer to network infrastructure components that provide wireless access for remote terminals. Depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of user equipments (UEs) within a coverage area 120 of gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, long term evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described herein. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
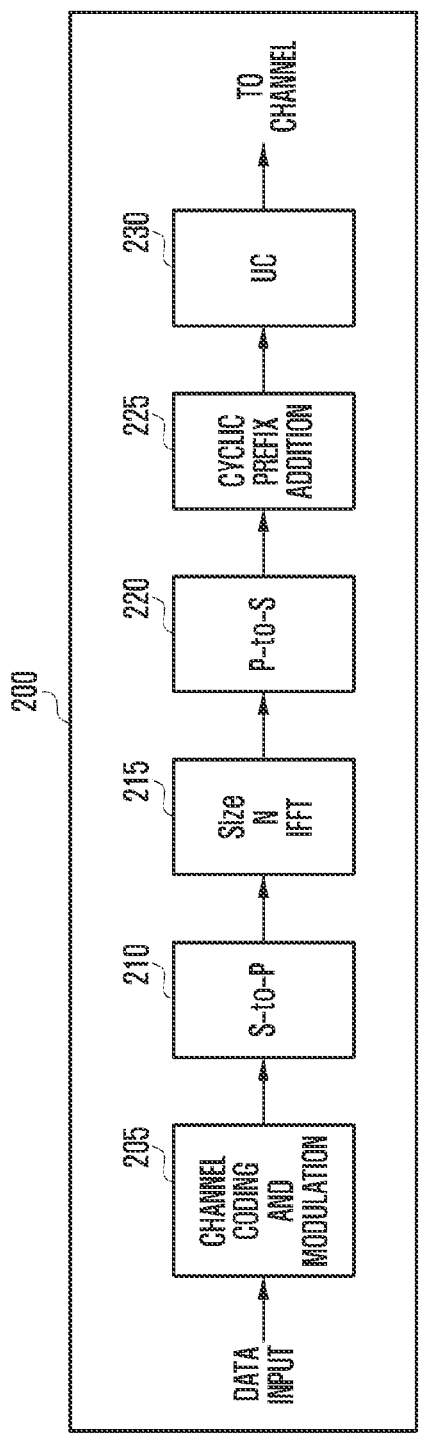
FIG. 2A illustrates an example wireless transmission path according to an embodiment.
Figure 2B:
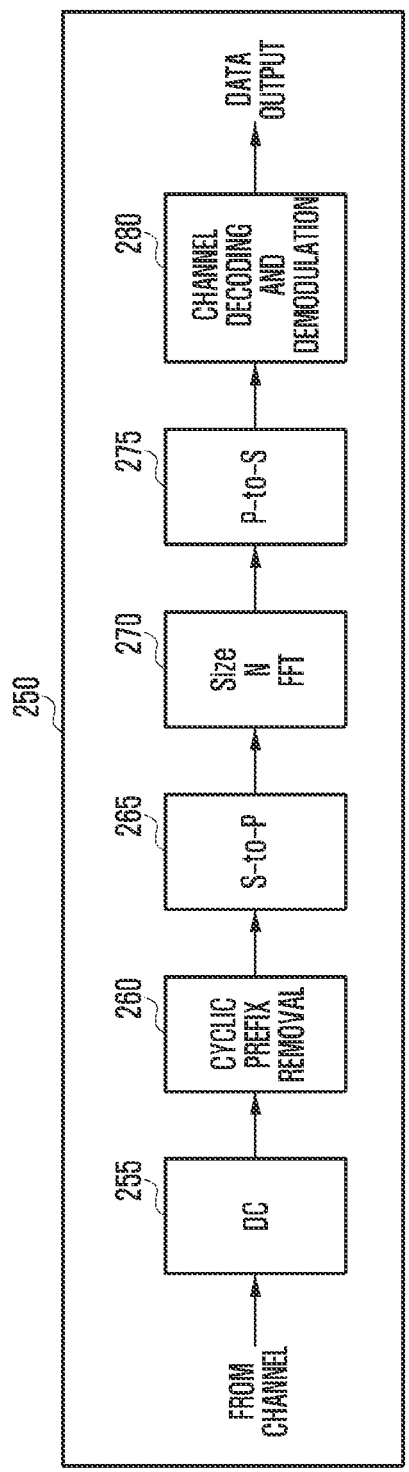
FIG. 2B illustrates an example wireless reception path according to an embodiment.

FIGS. 2A and 2B illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described herein.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, an S-to-P block 265, a size N fast Fourier transform (FFT) block 270, a P-to-S block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or QAM) to generate a sequence of frequency-domain modulated symbols. The S-to-P block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The P-to-S block 220 converts (such as multiplexes) parallel time-domain output symbols from the size N IFFT block 215 to generate a serial time-domain signal. The cyclic prefix addition block 225 inserts a cyclic prefix into the time-domain signal. The UC 230 modulates (up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The DC 255 down-converts the received signal to a baseband frequency, and the cyclic prefix removal block 260 removes the cyclic prefix to generate a serial time-domain baseband signal. The S-to-P block 265 converts the time-domain baseband signal into a parallel time-domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
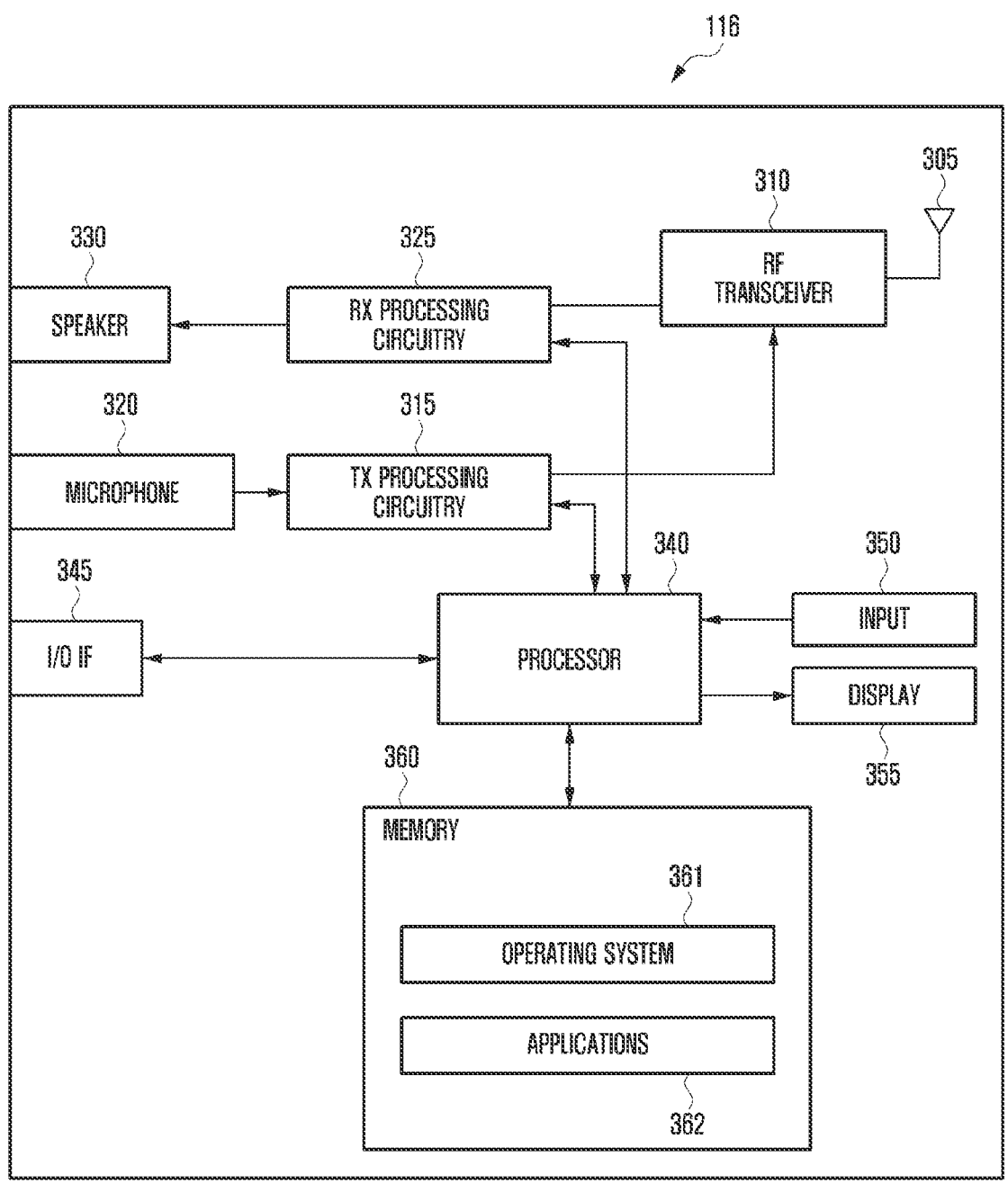
FIG. 3A illustrates an example UE according to an embodiment.

FIG. 3A illustrates an example UE 116 according to an embodiment. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described herein. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
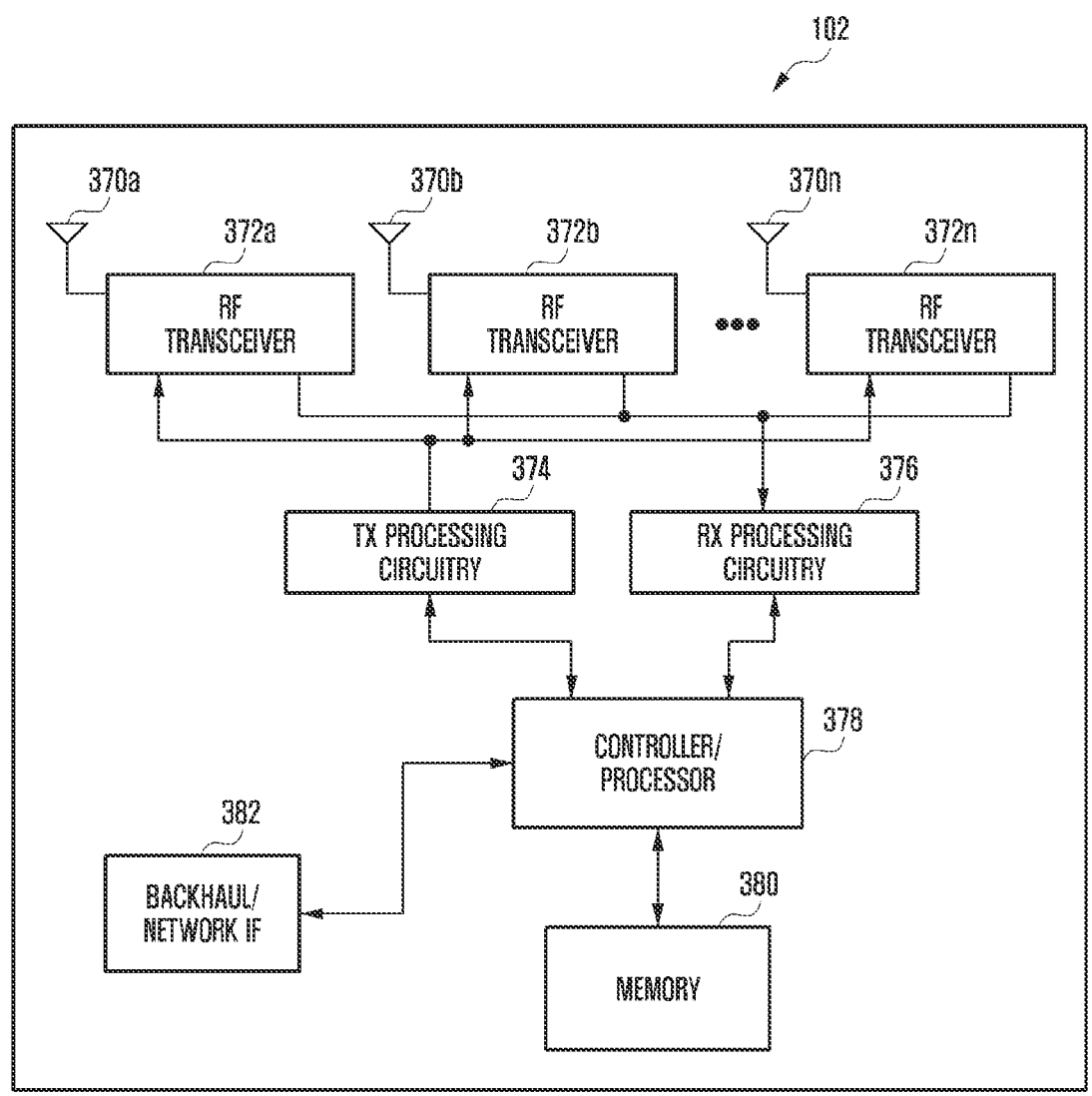
FIG. 3B illustrates an example gNB according to an embodiment.

FIG. 3B illustrates an example gNB 102 according to an embodiment. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. The controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described herein. In some embodiments, the controller/processor 378 supports communication between entities such as web real time communications (RTCs). The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio (NR) access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with frequency division duplex (FDD) cells and time division duplex (TDD) cells.

Although FIG. 3B illustrates an example of gNB 102, various changes may be made to FIG. 3B. For example, gNB 102 can include any number of each component shown in FIG. 3B. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Figure 4:
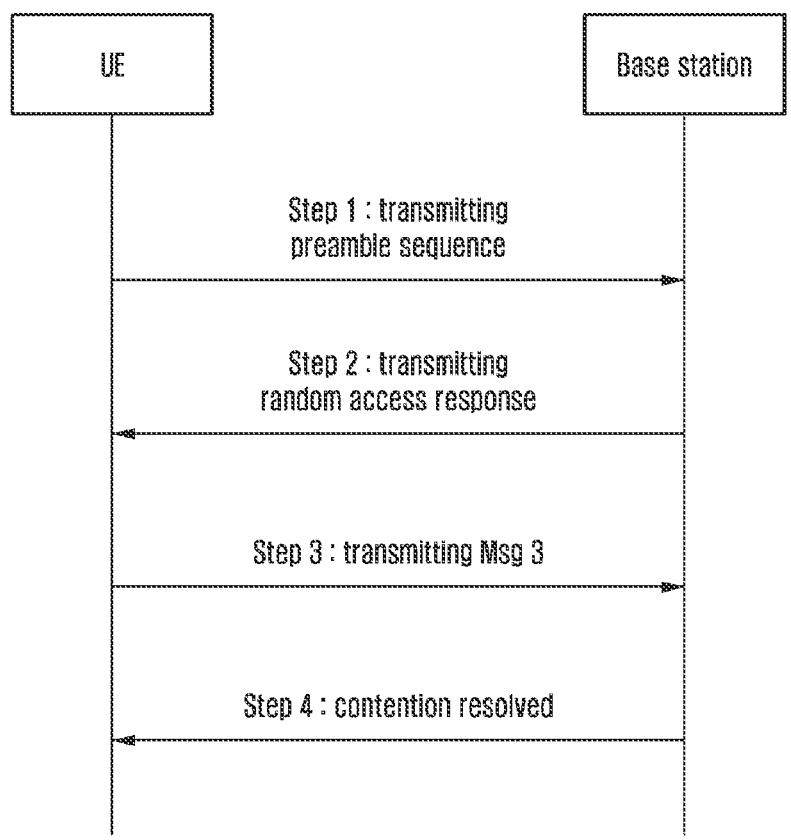
FIG. 4 illustrates a contention-based random access procedure according to an embodiment.

FIG. 4 illustrates a contention-based random access procedure according to an embodiment.

Transmission in a wireless communication system includes transmission from a base station (gNB) to a user equipment (UE) (referred to as downlink transmission), the slot corresponding to which is called a downlink slot; and transmission from the UE to the base station (referred to as uplink transmission), the slot corresponding to which is called uplink slot.

In the downlink communication of the wireless communication system, the system periodically transmits synchronization signals and broadcast channels to the user via a synchronization signal block (SSB/PBCH block), the periodicity of which is an SSB periodicity, or may be called an SSB burst periodicity. At the same time, the base station may configure a physical random access channel (PRACH) configuration period, during which a certain number of random access transmission opportunities (also called random access opportunities, PRACH transmission occasion, RO) are configured, which satisfy that all SSBs can be mapped to the corresponding RO within a mapping cycle (a certain duration).

In an NR communication system, before radio resource control is established, such as during random access procedure, the performance of random access directly affects the user experience. In conventional wireless communication systems, such as LTE and LTE-Advanced, the random access procedure is applied in multiple scenarios, such as initial connections establishment, cell handover, uplinks re-establishment, and radio resource control (RRC) connection re-establishment, etc.; and divided into contention-based random access and contention-free random access depending on whether the UE occupies the preamble sequence resource exclusively or not. Since a preamble sequence is selected from the same preamble sequence resources during the attempt of establishment of an uplink connection by respective UE in the contention-based random access, it may be possible for a plurality of UEs to select a same preamble sequence to be transmitted to the base station. Hence, a contention resolution mechanism becomes an important research aspect of random access. How to reduce the contention probability and how to rapidly resolve contentions that have already taken place are key indicators that influence the performance of random access.

The contention-based random access procedure in LTE-A consists of four steps, as shown in FIG. 4. In the first step, a UE randomly selects one preamble sequence from a preamble resource pool and transmits it to the base station. The base station performs correlation detection on the received signals to identify the preamble sequence transmitted by the UE. In the second step, the base station transmits a random access response (RAR) to the UE, which includes a random access preamble sequence identifier, a timing advance indication determined according to a time delay estimation between the UE and the base station, a temporary cell-radio network temporary identifier (C-RNTI), and time-frequency resources allocated to the UE for a next uplink transmission. In the third step, the UE transmits a message 3 (Msg3) to the base station according to information in the RAR. The Msg3 includes information such as a user terminal identifier and RRC connection request, etc., wherein the user terminal identifier is unique to the UE and used to resolve contentions. In the fourth step, the base station transmits a contention resolution identifier to the UE, including an identifier of the user terminal which is the winner of the contention resolution. The UE upgrades the temporary C-RNTI to C-RNTI after detecting the identifier thereof, transmits an acknowledge (ACK) signal to the base station to complete the random access procedure, and waits for the scheduling of the base station. Otherwise, the UE may start a new random access procedure after a period of time delay.

For a contention-free random access procedure, the base station may allocate a preamble sequence to the UE since it has known the identifier of the UE. Hence, the UE does not need to randomly select a sequence before transmitting the preamble sequence, and instead, the UE uses an allocated preamble sequence. The base station may transmit a corresponding RAR after detecting the allocated preamble sequence, and the RAR includes information such as timing advance and uplink resource allocation etc. After receiving the RAR, the UE recognizes that uplink synchronization has been completed and waits for further scheduling of the base station. Therefore, the contention-free random access procedure includes only two steps: the first step is to transmit a preamble sequence; and the second step is to transmit an RAR.

The random access procedure in LTE is applicable to the following scenarios:
1. Initial access from RRC_IDLE;
2. RRC connection re-establishment procedure;
3. Cell handover;
4. Downlink data arrival during RRC_CONNECTED requiring random access procedure (when the uplink synchronization status is "non-synchronized");
5. Uplink data arrival during RRC_CONNECTED requiring random access procedure (when the uplink synchronization status is "non-synchronized", or there are no PUCCH resources for the scheduling request); and
6. Positioning.

However, in systems that use beamforming and/or systems with limited coverage, in the initial access phase, users may eventually fail to access due to mobility or other reasons, e.g., fail to receive message 3 (msg3) transmitted in the random access procedure; thus, how to provide sufficient beamforming gain and/or provide sufficient coverage in the initial access procedure such that the signal can be correctly received in time is a problem that needs to be solved.

With regards to FIG. 4, an example configuration of a random access opportunity is shown.

In particular, a method and device for uplink signal transmission are described. It is used to enhance the coverage of the uplink transmission signal and improve the beamforming gain.

In the four-step contention-based random access procedure or the two-step contention-free random access procedure, the UE may detect that it receives the feedback information message 2 (PDCCH scheduling PDSCH) from the base station after transmitting message 1 (random access preamble), wherein the PDSCH carries the random access feedback (RAR) for the UE, and the RAR carries the grant (UL grant) for scheduling the UE to perform uplink transmission, which is message 3 in four-step contention-based random access.

Because the UE may not have access to the system at this time, or the base station has not yet clearly identified the identity of the UE that is performing random access, the base station cannot accurately know the UE's situation, thus it may not be possible to accurately schedule uplink transmissions, which causes the modulation and coding scheme (MCS) in the configured uplink grant and/or the size of the time-frequency resource to be inappropriate; or because the UE itself is located far away, it cannot be well served by the coverage of the base station device. Therefore, the design of repetition transmission of the uplink signal is an effective way to improve the uplink signal of the UE.

Specifically, the UE obtains the configuration information of repetition transmission of the uplink signal through the system information from the base station, and/or the downlink control information (DCI) for scheduling uplink transmission or the RAR in the PDSCH. In particular:

Through system information configuration or a pre-set method, the UE obtains one or more sets (for example, 16 sets) of resource configuration information that can be used for message 3 (mgs3) PUSCH transmission;

Through the DCI scheduling message 3 PUSCH (retransmission) transmission and/or the RAR scheduling message 3 PUSCH (initial) transmission, the UE obtains a set of resource configuration information indicated for the message 3 PUSCH transmission; in particular, the set of resource configuration information indicated may be one of the multiple sets of resource configuration information obtained through the system information configuration or the pre-set method, and may be indicated in the way of index; for example, as for 16 sets of configuration, it can be indicated by 4 bits.

The resource configuration information may be time domain resource configuration information, and/or frequency domain resource configuration information.

The configuration information and the corresponding determination method of UE may include at least one of type of repetition transmission, determination of redundancy version index in repetition transmission, and determination of transmit beam of repetition transmission.

The configuration information may also include an indication of activating message 3 retransmission (that is, whether the configuration information includes indication for message 3 retransmission); when the base station does not know whether the UE supports the capability of message 3 retransmission (for example, in the phase of random access message 3 transmission, the contention has not been resolved, thus, the base station device cannot identify the identity of the UE and therefore does not know the capability information of the UE). In particular, it can be one of the following methods:

Explicit notification—Through explicit bit information in the system information from the base station, and/or in the DCI for scheduling uplink transmission or the RAR in the PDSCH (for example, 1 bit information for indicating activating message 3 retransmission, wherein, "1" means to activate, and "0" means not to activate), the UE can obtain the indication of performing message 3 retransmission configured by the base station; then UEs that support the PUSCH retransmission of message 3 can obtain the indication of the corresponding bit information, and in turn read the resource configuration information for the PUSCH retransmission of message 3; meanwhile, UEs that do not support the PUSCH retransmission of message 3 (for example, UEs of old versions) can ignore the indication of bit information.

Implicit indication—Through the resource configuration information from the base station device, the UE determines whether to perform PUSCH retransmission of message 3; in particular, the resource configuration information of the base station device used to determine whether to perform PUSCH retransmission of message 3 may be one of the following or a combination of multiple specific configurations:

Specific DMRS configuration information
Specific number of DMRS symbols (for example, 4 DMRS symbols, that is, dual DMRS symbols and including 2 additional DMRS symbols); i.e., when the specific number of DMRS symbols is configured, the UE should perform PUSCH repetition transmissions of message 3;

Specific DMRS port (for example, DMRS port index 1), that is, when the specific DMRS port index 1 is configured, the UE should perform PUSCH repetition transmissions of message 3:

Specific DMRS sequence index (for example, DMRS sequence index 1), that is, when the specific DMRS sequence index 1 is configured, the UE should perform PUSCH repetition transmissions of message 3; and Position of a specific DMRS symbol (for example, DMRS front loaded or DMRS in a special position), that is, when the specific DMRS symbol position is configured, the UE should perform PUSCH repetition transmissions of message 3.

Specific modulation and coding scheme (MCS)

Indication through specific MCS index (for example, the largest MCS index or the smallest MCS index), that is, when the specific MCS index is configured, the UE should perform PUSCH repetition transmissions of message 3.

Specific Transport Block Size (TBS)

Specific TBS value, that is, when the specific TBS value is configured, the UE should perform PUSCH repetition transmissions of message 3; and Less than (not greater than) a fixed or configured TBS threshold, that is, when the configured TBS is less than (not greater than) a fixed or configured TBS threshold, the UE should perform PUSCH repetition transmissions of message 3.

When the UE does not support PUSCH repetition transmission of message 3, the UE does not use the above-described specific configuration (that is, does not use a specific DMRS port, etc.), but uses A default configuration or other configurations.

The base station device can determine whether the current UE has performed the PUSCH repetition transmission of message 3 by detecting whether a specific configuration is used in the transmission of message 3. For example, if the base station device detects a specific DMRS port in the PUSCH repetition transmission of message 3, the base station device can determine that the UE has performed PUSCH repetition transmission of message 3, and can detect subsequent repetition transmissions; if the base station device detects a non-specific DMRS port in the PUSCH repetition transmission of message 3, the base station device can determine the UE does not perform the PUSCH repetition transmission of message 3, and may not detect subsequent repetition transmissions, and/or reconfigure the time-frequency resources configured for subsequent repetition transmissions (for example, reconfigure to other users).

The specific configuration can be applied to:

Only PUSCH (all repetition) transmission of the initial message 3 (that is, message 3 PUSCH transmission scheduled by RAR); or Only the first repetition transmission among PUSCH (all repetition) transmission of the initial message 3 (that is, the first repetition transmission among repetition transmission of message 3 PUSCH transmission scheduled by RAR); or PUSCH (all repetition) transmission of the initial message 3 and PUSCH (all repetition) transmission of the subsequent message 3 (that is, scheduled by DCI scrambled with TC-RNTI); or The first repetition transmission among PUSCH (all repetition) transmission of the initial message 3 (that is, the first repetition transmission among repetition transmission of message 3 PUSCH transmission scheduled by RAR) and the first repetition transmission among PUSCH (all repetition) transmission of the subsequent message 3.

Figure 5:
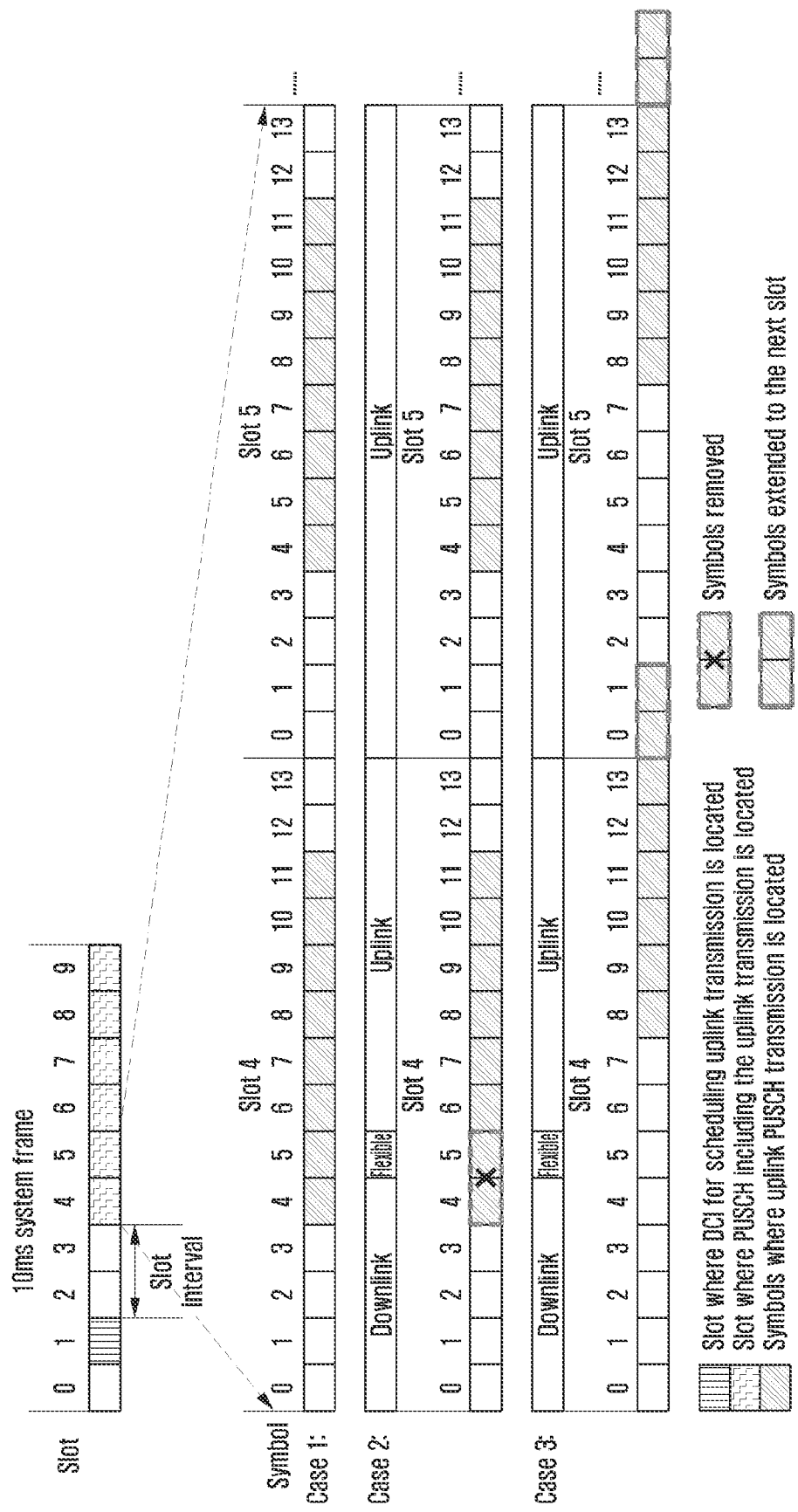
FIG. 5 illustrates a diagram of an example of a first type of message 3 (Msg3) PUSCH repetition according to an embodiment.
Figure 6:
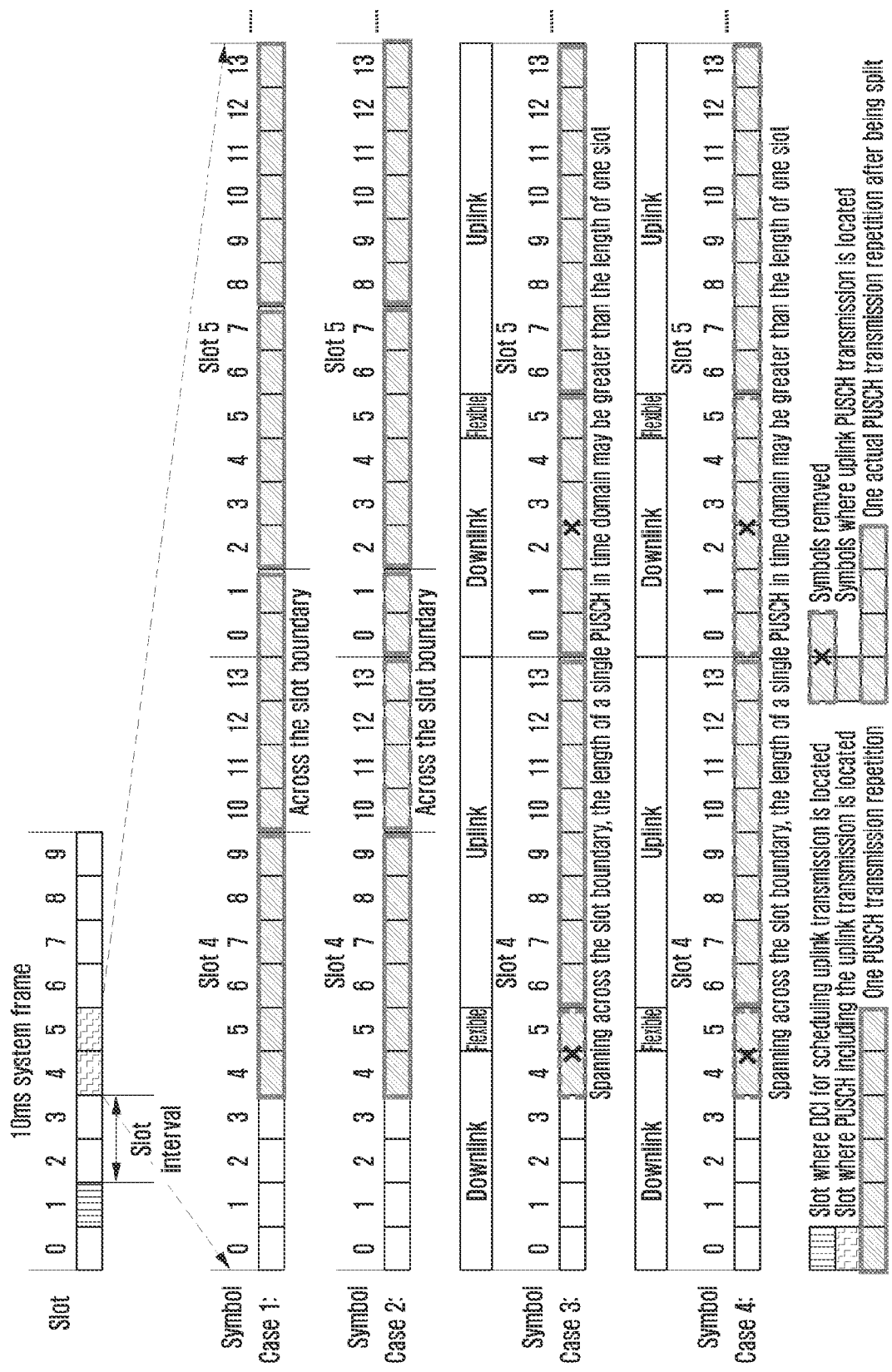
FIG. 6 illustrates a diagram of an example of a second type of PUSCH repetition according to an embodiment.
Figure 7:
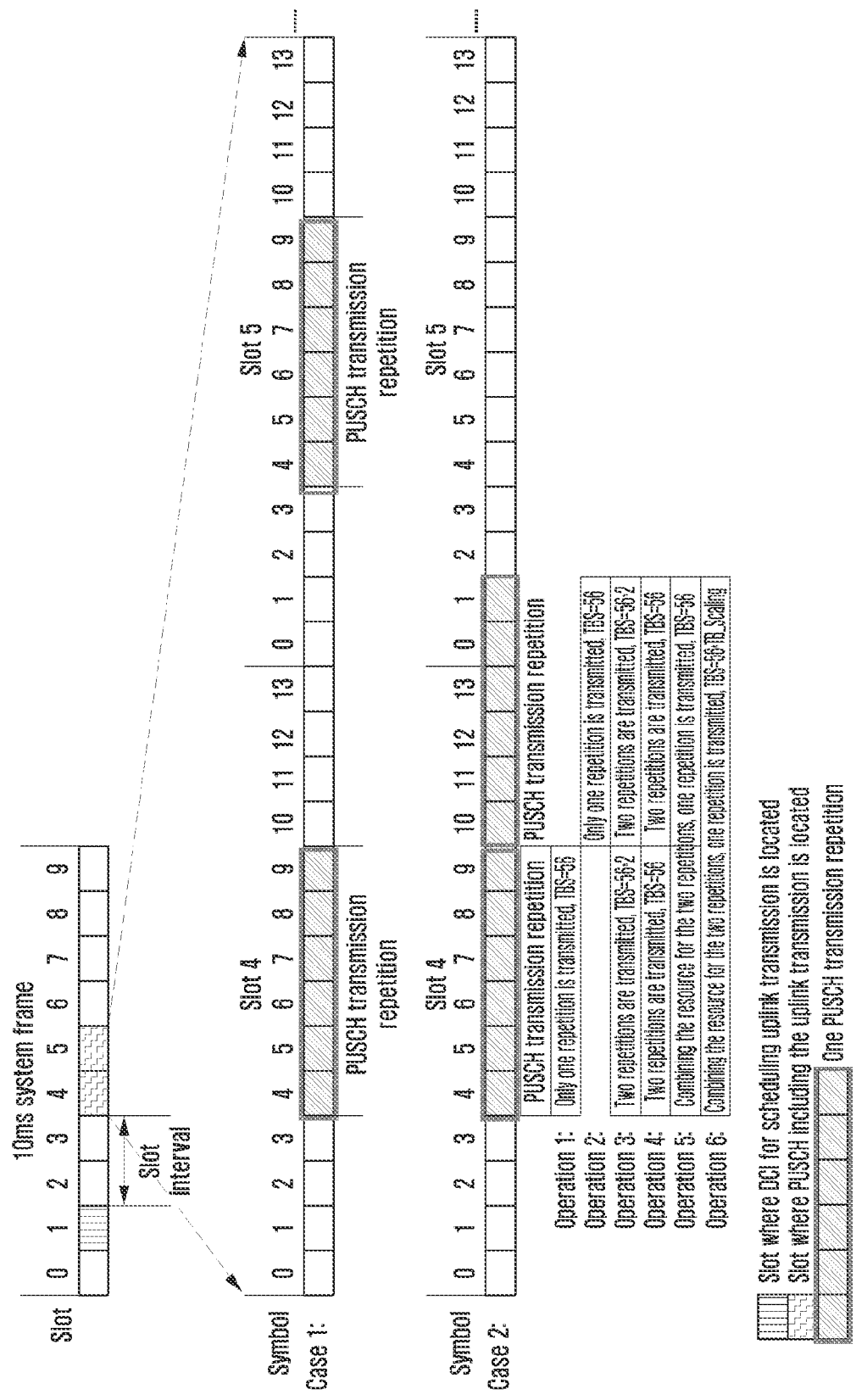
FIG. 7 illustrates a diagram of an example of a third type of PUSCH repetition according to an embodiment.

Hereinafter, the type of repetition transmission according to embodiments will be described with reference to FIGS. 5 to 7. The repetition transmission includes three types. FIG. 5 illustrates a diagram of an example of a first type of message 3 (Msg3) PUSCH repetition according to an embodiment. FIG. 6 illustrates a diagram of an example of a second type of PUSCH repetition according to an embodiment. FIG. 7 illustrates a diagram of an example of a third type of PUSCH repetition according to an embodiment.

As shown in FIG. 5, the first type of repetition transmission, in particular, includes at least one of:

The first slot after X1 slot intervals after the end position of the slot where the downlink signal for scheduling uplink transmission is located is the starting slot of the scheduled uplink transmission.

The starting symbol position of PUSCH transmission and/or the number of symbols occupied by PUSCH transmission in one slot, in which the one slot may be the first slot among all PUSCH repetition transmissions.

Number of times of repeated PUSCH transmissions, that is, the number of slots with PUSCH transmission.

The starting symbol position of and/or the number of symbols occupied by PUSCH transmission configured on each slot with PUSCH transmission are the same, which are the same as the starting symbol position of and/or the number of symbols occupied by PUSCH transmission configured on the first slot.

The "slots" and "symbols" (OFDM symbols) described herein can be replaced with other time domain units.

As shown in FIG. 5, the PUSCH transmission of message 3 is scheduled on slot 1, slot 4—which is 2 slots interval after slot 1—is the first slot on which PUSCH is transmitted, and the number of repetitions is 6; thus, as for this type, the starting symbol position of and/or the number of symbols on the slot occupied by transmission of PUSCH repetition on slots 4-9 are the same, as shown by case 1 in FIG. 5.

When an OFDM symbol configured for one PUSCH transmission repetition satisfies one or more of the following conditions, the UE would not perform PUSCH transmission on the configured OFDM symbol:

The configured OFDM symbol overlaps the downlink part (or downlink part+interval value) in the uplink or downlink configuration;

The configured OFDM symbol overlaps with the flexible part (or flexible part+interval value) in the uplink or downlink configuration;

The configured OFDM symbol overlaps with a special downlink signal (or special downlink signal+interval value) configured and transmitted by the base station; the special downlink signal may be at least one of SSB configured and transmitted by the base station, other downlink signals configured and transmitted by the base station, such as SIB1 PDSCH for transmitting system information, or control resource set (CORESET) for scheduling system information, search space, etc.;

The interval between (the starting position of) the configured OFDM symbol and the end position of the downlink part (or flexible part, or special downlink signal configured and transmitted by the base station) in the uplink or downlink configuration is less than (not greater than) an interval value; and The interval value may be pre-configured by the base station, or configured in a system message (or DCI or RAR), or fixed.

When there is configured OFDM symbols which is not used for transmission, the UE needs to perform at least one of the following operations:

If the configured OFDM symbol includes DMRS symbols (the number of which is a positive integer X), the first X symbols of the remaining OFDM symbols on the slot used to transmit PUSCH are used to transmit the DMRS symbols;

According to the remaining OFDM symbols used to transmit PUSCH on this slot, recalculating the number of resource elements (REs) for the data to be transmitted, determining the available MCS, and selecting the lowest MCS that can satisfy the transmission data size (transport block size), i.e., rate matching; AND According to the configured MCS and/or the number of REs, during the transmission, the signal is not transmitted on the configured OFDM symbols which are not used for transmission; that is, the data on the OFDM symbols which are not used for transmission are directly punctured.

As shown by case 3 in FIG. 5, the starting position of the OFDM symbol and the number of OFDM symbols occupied by PUSCH transmission in one slot, which is configured to the UE by the base station, may be extended to the next slot; this configuration method may make the base station more flexible when configuring this type of PUSCH repetition, and can make better use of the slots with downlink and/or flexible parts (for example, if the symbols occupied on one slot are not allowed to extend to the next slot, the configuration received by the UE may be similar to the example in case 1, and PUSCH transmissions in each slot become the PUSCH transmission with a length of 6 and starting from symbol 6):

if the OFDM symbol extended to the next slot satisfies one or more of the following conditions described in the above case 2, the UE would not perform PUSCH transmission on the configured OFDM symbol, and the detailed processing method will be as the description in case 2; and The OFDM symbol extended to the next slot still belongs to this slot and is used to transmit the PUSCH part to be transmitted in this slot, that is, the data transmitted on the OFDM symbol extended to the next slot is transmitted according to the number of REs calculated as well as the signal modulated and coded in this slot.

According to the method described with reference to FIG. 5, it is possible to enable the user equipment (UE) to perform multiple repetition transmissions during the transmission of the uplink data signal.

As shown in FIG. 6, the second type of repetition transmission, in particular, may include at least one of the following configurations and/or operations:

The first slot after X1 slot intervals after the end position of the slot where the downlink signal for scheduling uplink transmission is located is the starting slot of the scheduled uplink transmission.

The starting symbol position of PUSCH transmission and/or the number of symbols occupied by PUSCH transmission in one slot, in which the one slot may be the first slot among all PUSCH repetition transmissions; the PUSCH transmission is one or the first PUSCH transmission repetition.

The number of PUSCH transmission repetitions; that is, the number of PUSCH transmission repetitions may be the number of PUSCH transmission nominal repetitions and/or the number of PUSCH transmission actual repetitions.

PUSCH transmission time window (that is, a period of time), wherein within the PUSCH transmission time window:
  According to the obtained starting point of the first PUSCH transmission repetition and the length of one PUSCH transmission, the UE derives multiple consecutive PUSCH transmissions, until the interval between the end position of the last PUSCH transmission repetition and the end position of the PUSCH transmission time window is less than a threshold; the threshold may be the length of PUSCH transmission, or a length value configured or preset by the base station;
  According to the obtained starting point of the first PUSCH transmission repetition and the length of one PUSCH transmission, the UE derives multiple consecutive PUSCH transmissions, until the number of nominal repetitions (or actual repetitions) reaches the number of PUSCH transmission repetitions configured or preset by the base station.

When one PUSCH transmission repetition is extended to the next slot (that is, one PUSCH transmission occupies symbols on multiple slots), the UE can perform at least one of the following processes:
  Direct transmission, that is, one PUSCH transmission repetition is allowed to span across the slot interval; as exemplified by case 1 in FIG. 6;
  Split transmission, that is, the PUSCH transmission is split into two parts according to the slot boundary; as exemplified by case 2 in FIG. 6, symbols 10~13 in slot 4 and symbols 0~1 in slot 5 are originally a complete PUSCH transmission repetition; in split transmission, the symbols 10~13 in slot 4 are split into one actual repetition, and symbols 0~1 in slot 5 are split into another actual repetition; (that is, one PUSCH transmission nominal repetition can be split into multiple actual repetitions); in particular, if the length of the actual repetition after being split (that is, the number of symbols occupied) is less than (or not greater than) a threshold, the split processing would not be performed; when each of the length of the actual repetition after being split (that is, the number of symbols occupied) is not less than (or greater than) a threshold, the split process would be performed; and
  The length of PUSCH transmission in the time domain (that is, the number of configured symbols) may be greater than the length of one slot in time domain.

When an OFDM symbol configured for one PUSCH transmission repetition satisfies one or more of the following conditions, the UE would not perform PUSCH transmission on the configured OFDM symbol:
  The configured OFDM symbol overlaps the downlink part (or downlink part+interval value) in the uplink or downlink configuration;
  The configured OFDM symbol overlaps with the flexible part (or flexible part+interval value) in the uplink or downlink configuration;
  The configured OFDM symbol overlaps with a special downlink signal (or special downlink signal+interval value) configured and transmitted by the base station; the special downlink signal may be at least one of the following: SSB configured and transmitted by the base station, other downlink signals configured and transmitted by the base station, such as SIB1 PDSCH for transmitting system information, or control resource set (CORESET) for scheduling system information, search space, etc.;
  The interval between (the starting position of) the configured OFDM symbol and the end position of the downlink part (or flexible part, or special downlink signal configured and transmitted by the base station) in the uplink or downlink configuration is less than (not greater than) an interval value;
  The interval value may be pre-configured by the base station, or configured in a system message (or DCI or RAR), or fixed; and
  When the aforementioned overlapping part is in the middle of a PUSCH transmission repetition (that is, there are symbols configured for PUSCH transmission both before and after the overlapping part), the UE regards the symbol after the overlapping part being removed as an actual repetition (that is, discontinuous actual repetition) (as exemplified by case 3 in FIG. 6, the combination of symbols 6~13 in slot 4 and 6~13 in slot 5 is regarded as one actual repetition); or similar to split transmission, the UE regards the configured symbols before and after overlapping part as actual transmissions respectively (i.e., 2 or more than 2 actual transmissions)(as exemplified by case 4 in FIG. 6, that is, symbols 6~13 in slot 4 is one actual repetition, and symbols 6~13 in slot 5 is another actual repetition).

When there is a configured OFDM symbol which is not used for transmission, the UE needs to perform at least one of the following operations:
  If the configured OFDM symbol includes DMRS symbols (the number of which is a positive integer X), the first X symbols of the remaining OFDM symbols on the slot used to transmit PUSCH are used to transmit the DMRS symbols;
  According to the remaining OFDM symbols used to transmit PUSCH on this slot, recalculating the number of REs for the data to be transmitted, determining the available modulation and coding scheme, and selecting the lowest modulation and coding scheme that can satisfy the transmission data size (transport block size), i.e., rate matching; and
  During the transmission in accordance with the configured MCS and/or the number of REs, the signal is not transmitted on the configured OFDM symbols which are not used for transmission; that is, the data on the OFDM symbols which are not used for transmission are directly punctured.

According to the method described with reference to FIG. 6, it is possible to enable the user equipment (UE) to perform multiple repetition transmissions during the transmission of the uplink data signal.

As for both of the two types described above with reference to FIG. 5 and FIG. 6, the base station (directly or indirectly) indicates the number of repetitions that the UE needs to transmit and/or the size of each repetition (occupied time-frequency resources, etc.) and/or MCS/TBS size in each repetition. The third type among the type of repetition transmission is described below with reference to FIG. 7. As for this type, the UE needs to autonomously determine the number, location and the like of the required PUSCH transmission repetition. In particular, this may include at least one of the following configurations and/or operations:

According to the methods for the above two types, the UE obtains the configured maximum available number of repetitions N (including the number of nominal repetitions and/or the number of actual repetitions, etc.), and/or the starting position and size of each (or the first) PUSCH transmission repetition, etc.; for example, as described in case 1 in FIG. 7, as for the repetition situation obtained according to the first type (that is, the number of repetitions is 2, and the first PUSCH transmission repetition is located at the first slot after 2 slots after the slot where DCI is scheduled), the starting positions of the two repetitions in the slot are both at symbol 4, and the length are both 6 symbols; for example, as described in case 2 in FIG. 7, as for the repetition situation obtained according to the second type (that is, the number of nominal repetitions is 2, the first PUSCH transmission repetition is located at the first slot after 2 slots after the slot where DCI is scheduled), the starting position of the first repetition in slot 4 is symbol 4, and the second repetitions is derived to be 6 consecutive symbols starting from symbol 10 according to the position of the first repetition and the configuration with length of 6 (extended to the next slot), assuming that that transmission spanning across the slot boundary is allowed at this time. Hereinafter, the method for the third type is explained by taking case 2 as an example; that is, N=2 and the configured TBS that can be carried on each repetition is 56 bits.

Operation 1 or 2: The UE selects the position of one repetition for PUSCH transmission according to a rule, wherein the rule may be one of the following or a combination thereof:

The position of the PUSCH repetition closest to the end position of the slot where the downlink for scheduling the uplink transmission is located. The position of the PUSCH repetition closest to the end position of the slot where the downlink for scheduling the uplink transmission is located is a nearest PUSCH repetition position that satisfies the processing time of UE (including processing downlink reception, preparing for uplink transmission, adjusting the timing advance), that is, the interval between the end position of the slot where the downlink for scheduling the uplink transmission is located and the starting position where the available uplink transmission repetition is located is greater than or not less than the processing time of UE. As shown in FIG. 7, if the processing time of the UE is 2.5 slots, the nearest PUSCH repetition position for UE after 2.5 slots after the downlink scheduling uplink transmission is the second PUSCH transmission repetition; which is beneficial for UE to transmit PUSCH as soon as possible; and Among the available PUSCH transmission repetitions, one PUSCH transmission repetition is randomly selected with equal probability for transmission; the available PUSCH transmission repetition is a PUSCH transmission repetition that satisfies the processing time of the UE.

Operation 3: The UE determines the number of repetitions N_x; the UE determining the number of repetitions may be determined according to the maximum available number of repetitions or the configured maximum number of repetitions; the number of repetitions is selected according to the amount of data to be transmitted by the UE; the UE determines the actual size of the TBS (TBS_x) transmitted in each actual repetition according to the selected number of repetitions N_x; TBS_x=N_x*TBS; as shown in FIG. 7, N_x=2, TBS=56, then TBS_x=56*2=112; which is beneficial for the UE to transmit its own data to be transmitted as much as possible. For example, assuming there are 100 bits for the UE to transmit, if the UE selects only one repetition, it can only transmit 56 bits; and if the UE can select two repetitions, the UE can transmit all 100 bits in one PUSCH transmission (two repetitions).

Operation 4: The UE determines the number of repetitions N_x; the UE determining the number of repetitions may be determined according to the maximum available number of repetitions or the configured maximum number of repetitions; in each determined PUSCH transmission repetition, the UE uses the TBS indicated (directly configured or indirectly through the resource size together with MCS) by fixed base station to transmit each PUSCH repetition;

Operation 5: The UE determines the number of repetitions N_x; the UE determining the number of repetitions may be determined according to the maximum available number of repetitions or the configured maximum number of repetitions; the UE regards time-frequency resource combination occupied by the determined PUSCH transmission repetitions as one PUSCH transmission resource, and it is transmitted according to the manner that the UE uses the TBS indicated (directly configured or indirectly through the resource size together with MCS) by the base station to transmit (that is, TBS remains unchanged, and MCS is changed, so that lower modulation order and/or coding rate can be used, higher modulation and coding gain can be obtained) or that the UE uses the MCS indicated (directly configured or indirectly through the resource size together with TBS) by the base station to transmit (that is, MCS remains unchanged, and TBS is changed, so that, so that more amount of data can be transmitted by the UE).

Operation 6: The UE can determine the size of TBS (TBS_x) used by the final transmission on the resource for the determined N_x PUSCH transmission repetition, according to the TB_scaling parameter or parameter set configured (or preset) by the base station and/or the amount of data (TBS_t) to be transmitted by the UE itself, wherein, the method for determining the size of TBS used by the final transmission includes selecting the smallest TB_scaling value such that TBS_x=TB_scaling*TBS is not less than (greater than) TBS_t. For example, the selectable TBS_S-caling value is (0.75, 0.5, 0.25), TBS_t=10, and TBS=56, thus the selected TBS_scaling=0.25 and the obtained TBS_x=14; then the UE can reselect the MCS according to the obtained TBS_x, which may use a lower modulation order and/or coding rate and obtain higher modulation and coding gain.

The repetition may be a nominal repetition or an actual repetition obtained by the UE.

The UE determining the number of repetitions N_x may also be determined by the UE according to the result of comparing the reference signal received power (RSRP) of the downlink reference signal (such as SSB, CSI-RS, etc.) with the corresponding threshold; for example, if there is N repetitions, there would be N-1 threshold; for example, assuming N=2, if the SSB-RSRP measured by the UE is less than (or not greater than) the threshold, the UE needs to select more repetitions (that is, N_x=2); if the SSB-RSRP measured by the UE is less than (or greater than) the threshold, the UE needs to select fewer repetitions (that is, N_x=1).

The UE determining the number of repetitions N_x can also be determined according to the number of (transmit) beams N_beam the UE has; for example, if N_beam is less than or not greater than the available number of repetitions, N_x=N_beam; if N_beam is not less than or greater than the available number of repetitions, N_x is the available number of repetitions.

According to the method described with reference to FIG. 7, it is possible to enable the user equipment (UE) to perform multiple repetition transmissions during the transmission of the uplink data signal.

Figure 8:
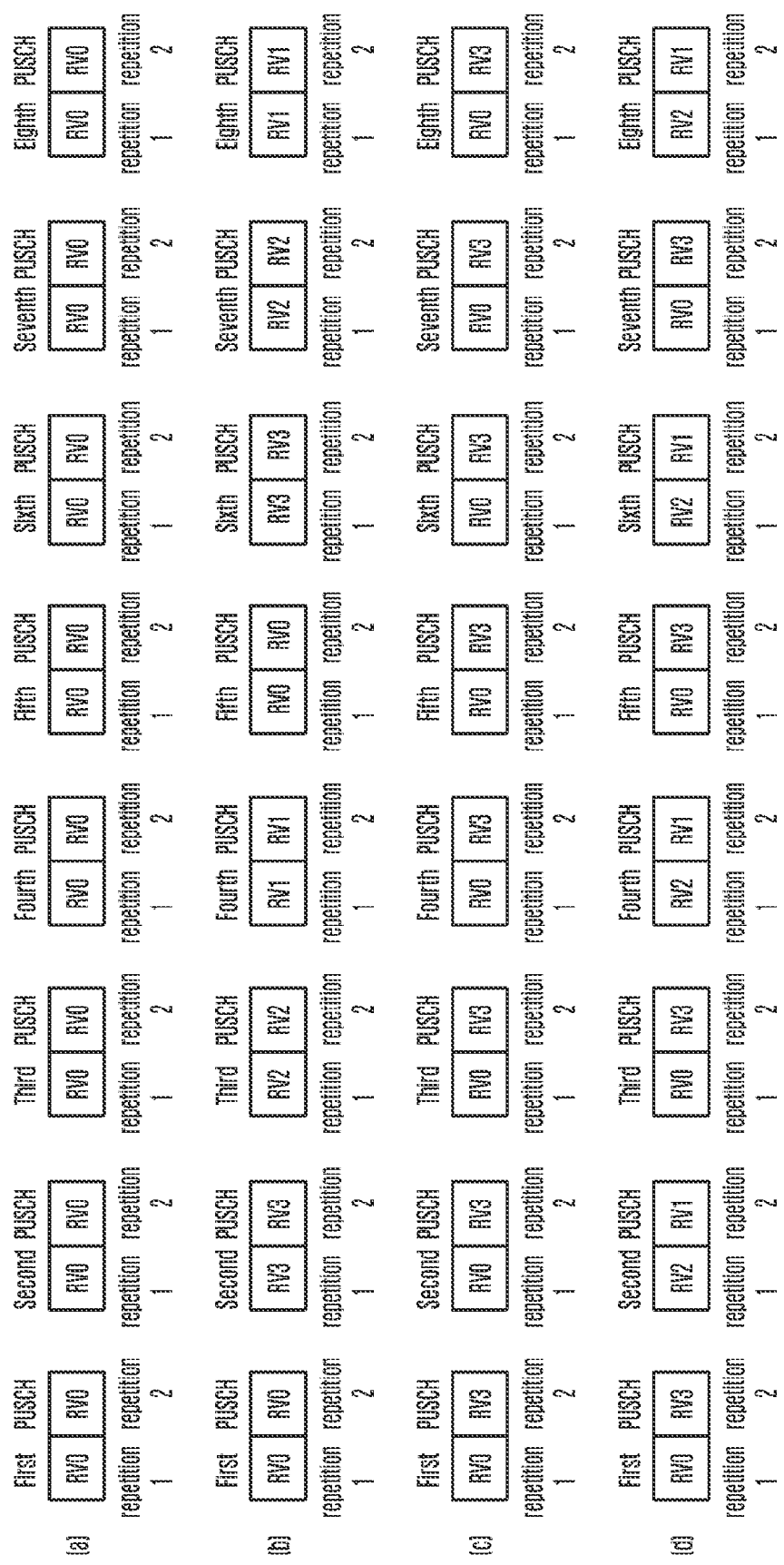
FIG. 8 illustrates a diagram of an example of an RV determination manner in PUSCH repetition according to an embodiment.

The determination of the redundancy version index in repetition transmission will be described below with reference to FIG. 8. FIG. 8 illustrates a diagram of an example of a redundancy version (RV) determination manner in PUSCH repetition according to an embodiment.

After coding the data to be transmitted, if the coded data sequence obtained has different indexes (such as 0, 1, 2, 3) in accordance with different redundancy versions (different versions represent different parts of the coded data sequence), then the method for determining redundancy version (RV) for the multiple PUSCH transmission repetition in the PUSCH transmission includes one or combination of the following:

For multiple PUSCH transmission repetitions in all PUSCH transmissions (including those in hybrid automatic repeat request (HARQ) retransmissions), the same RV is used, such as RV 0, as shown in (a) in FIG. 8.

For multiple PUSCH transmission repetitions in one PUSCH transmission, the same RV is used; but for PUSCH transmission repetitions in different PUSCH transmissions, the RV index is used in a certain order, for example, the certain order is RV 0, 2, 3, 1; for multiple PUSCH transmission repetitions in the first PUSCH transmission, RV 0 is used; for multiple PUSCH transmission repetitions in the second PUSCH transmission (retransmission that can be scheduled by DCI), RV 2 is used; for multiple PUSCH transmission repetitions in the third PUSCH transmission (retransmission that can be scheduled by DCI), RV 3 is used; and so on; if the used RV order reaches the last value, the RV order will be used cyclically in the next PUSCH transmission, as shown in (b) in FIG. 8.

For PUSCH transmission repetitions in one PUSCH transmission, the RV index is used in a certain order; but for PUSCH transmissions in different PUSCH transmissions, the same RV is used (it can also be considered as that the RV is determined in a certain order whenever each PUSCH transmission restarts), as shown in (c) in FIG. 8.

For multiple PUSCH transmission repetitions (that is, all the possible PUSCH transmission repetition) in all PUSCH transmissions (including those in HARQ retransmissions), the RV index is used in a certain order. For example, as shown in (d) in FIG. 8, for repetition 1 in the first transmission, RV 0 is used; for repetition 2 in the first transmission, RV 3 is used; for repetition 1 in the second transmission, RV 2 is used; and for repetition 2 in the second transmission, RV 1 is used.

The RV index used in a certain order may be a longer index version, and the order is arranged according to the correlation and/or complementarity between different RVs. For example, two RVs with strong correlation should be arranged in adjacent position in the order as much as possible. For example, as for 8 RVs, the certain order may be 0, 3, 2, 1, 4, 7, 6, 5 and so on.

According to the method described with reference to FIG. 8, the user equipment (UE) can determine the RV based on a certain method, and perform multiple repetition transmissions.

Figure 9:
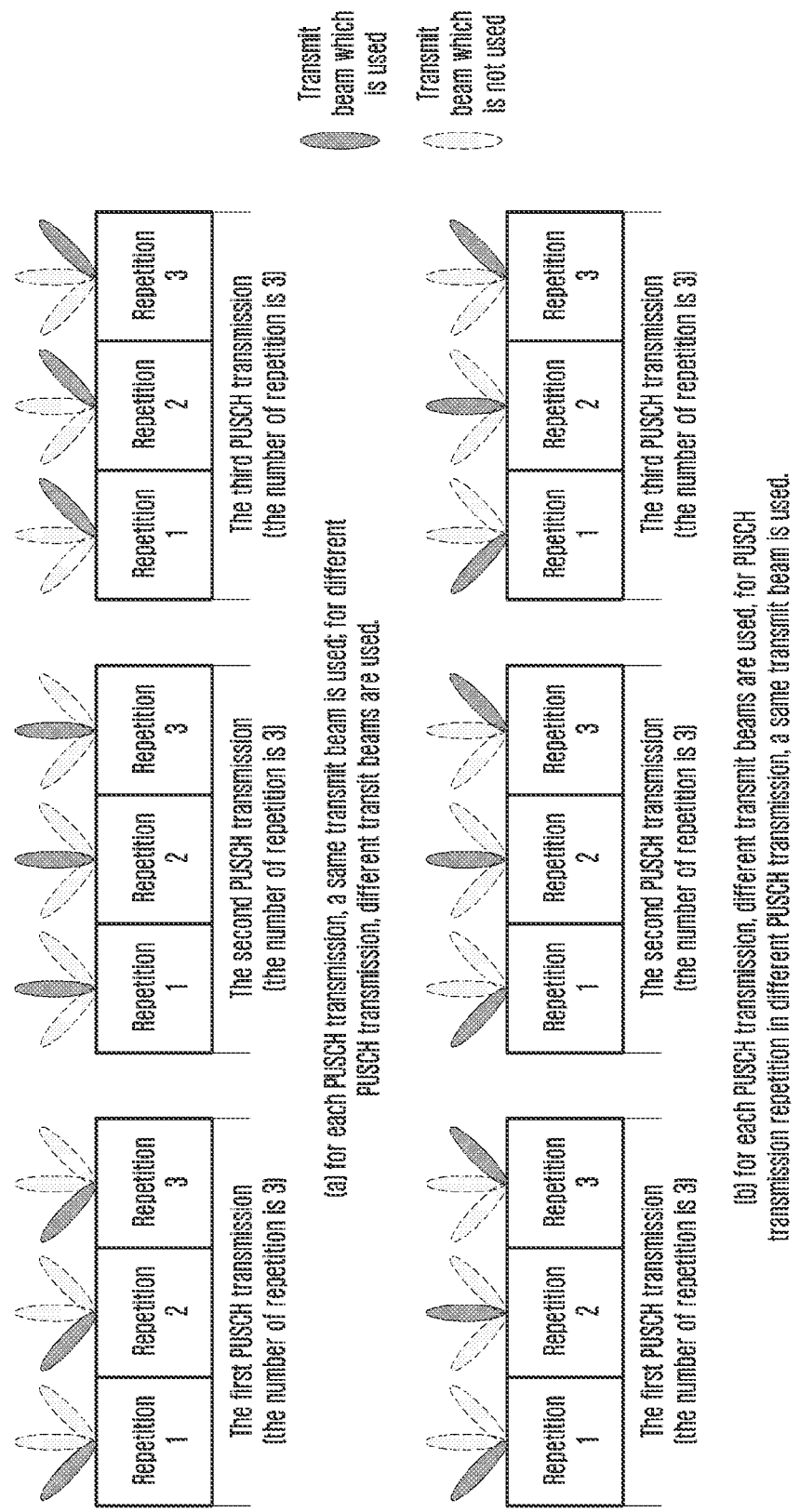
FIG. 9 illustrates a diagram of an example of determination of a transmit beam in PUSCH repetition according to an embodiment.

The determination of the RV index in repetition transmission will be described below with reference to FIG. 9. FIG. 9 shows a diagram of an example of determination of transmit beam in PUSCH repetition according to an embodiment.

If it is determined that there are multiple PUSCH transmission repetitions and the UE has capability of multiple transmits beams, the method for determining transmit beams for the multiple PUSCH transmission repetitions in the PUSCH transmission includes one or more combinations of the following:

For multiple PUSCH transmissions in all PUSCH transmissions (including those in HARQ retransmissions), the same transmit beam is used. One transmit beam among the transmit beams that UE has can be randomly selected with equal probability; or the transmit beam which is the same as the transmit beam used to transmit the corresponding preamble in the RAR is used; this method can be used to determine the transmit beam for all repetitions or the first repetition in the first PUSCH, or for all PUSCH repetitions (including PUSCH repetitions in different PUSCH transmissions).

For multiple PUSCH transmissions in one PUSCH transmission, the same transmit beam is used, and for different PUSCH transmissions, different transmit beams are used, as shown in (a) in FIG. 9.

For multiple PUSCH transmissions in one PUSCH transmission, different transmit beams are used, and for different PUSCH transmissions, the same transmit beam is used, as shown in (b) in FIG. 9.

When the interval between the starting time of PUSCH transmission of message 3 and the position (end position) where the preamble is transmitted is not greater than (or less than) a certain threshold, the beam for PUSCH transmission of message 3 and the beam for transmitting the preamble are the same; otherwise, they are different. The (end position of) position where the preamble is transmitted may also be the position (end position) where the corresponding downlink signal of the received random access is located.

In particular, the resource determination or configuration method of repeating the aforementioned PUSCH transmission and/or PUSCH transmission can be used for message 3, or normal PUSCH transmission, or quasi-static uplink transmission based on higher-layer scheduling, or PUSCH transmission in message A in the 2-step contention based random access.

After selecting different transmit beams or different numbers of times of repetition, the base station can determine the different transmit beams or different numbers of times of repetition and the like selected by the user in the way of blind detection; the auxiliary information transmitted by the UE helps the base station obtain the above information, in order to reduce or avoid the burden of blind detection; in particular, the transmitted auxiliary information may include at least one of the following:

The transmitted auxiliary information may be one or more of: the number of times of repetitions determined by the UE, the number and/or index of the transmit beams of UE, the TBS and/or MCS determined by the UE, etc., reference signal index of one or more downlink beams selected by the UE (for example, the base station has performed beam improvement operations during the initial access procedure).

The way of transmitting auxiliary information can be achieved by uplink control information (UCI) information being carried on PUSCH. The UCI can adopt an independent coding scheme or joint coding scheme for different auxiliary information; The UCI information to be transmitted can also be mapped to the symbols in the manner that the symbol is as close as possible to DMRS; that is, the modulation symbols obtained by UCI are mapped to the RE around DMRS in the manner that: the mapping is performed with the DMRS in the PUSCH being centered and in the order that first to the one on the left of the center and then to the one on the right of the center (or first to the one on the right of the center and then to the one on the left of the center) or first to the one in the frequency domain and then to the one in the time domain (first to the one in the time domain and then to the one in the frequency domain).

The UCI can be carried in every repetition of a transmission, or only in a certain (for example, the first) repetition;

In this way, although the UCI may change over different PUSCH transmissions, because it is separated from the PUSCH, it does not affect the repetition combination of different PUSCH repetitions.

The method for PUSCH repetition transmission disclosed herein can be used not only for msg3 (or PUSCH scheduled by RAR) transmission or retransmission, but also for PUSCH transmission and retransmission scheduled by normal DCI.

The method for PUSCH repetition transmission disclosed herein can be used to transmit multiple repetitions of the same transport block (TB)(that is, the same information content is repeatedly transmitted on multiple PUSCH resources) and/or used to transmit multiple TBs (that is, different information content is transmitted on multiple PUSCH resources).

According to the method described with reference to FIG. 9, the user equipment (UE) can determine the RV based on a certain method, and perform multiple repetition transmissions.

Figure 10:
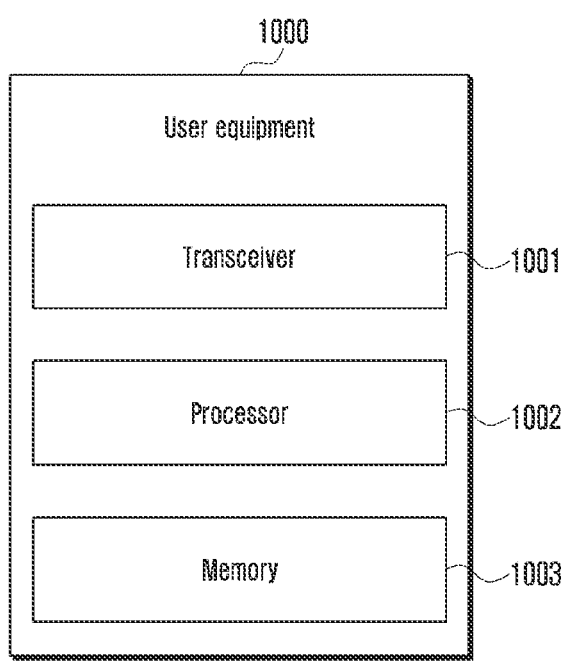
FIG. 10 is a block diagram illustrating a UE according to an embodiment.

FIG. 10 illustrates a block diagram of a UE according to an embodiment.

Referring to FIG. 10, the UE 1000 comprises a transceiver 1001, a processor 1002, and a memory 1003. The transceiver 1001, the processor 1002, and the memory 1003 are configured to perform operations of the UE shown in FIGS. 1 to 9 and/or described above.

The above embodiments are not intended to limit the present disclosure, and any modification, equivalent replacement, or improvement made within the spirit and principles of the present disclosure shall be included within the protection scope of the present disclosure.

Those skilled in the art may understand that the present disclosure includes devices involved to perform one or more of the operations described in this disclosure. These devices may be specially designed and manufactured for the required purpose, or may include known devices in general-purpose computers. These devices have computer programs stored therein that are selectively activated or reconstructed. Such computer programs may be stored in readable medium of a device (e.g., a computer) or stored in any type of medium suitable for storing electronic instructions and are respectively coupled to a bus, the said readable medium of a computer includes but not limited to any types of disks (including floppy disks, hard disks, compact disk, CD-ROMs, and magneto-optical disks), ROM, RAM, EPROM (Erasable Programmable Read-Only Memory), EEPROM (Electrically Erasable Programmable Read-Only Memory), flash memory, magnetic card or optical card. That is, a readable medium includes any medium that stores or transmits information in a form by readable a device (e.g., a computer).

Those skilled in the art may understand that computer program instructions may be used to implement each block in these structural diagrams and/or block diagrams and/or flow diagrams and a combination of these structural diagrams and/or block diagrams and/or flow diagrams. Those skilled in the art may understand that these computer program instructions may be provided to a processor of a general purpose computer, a special purpose computer, or other programmable data processing methods to implement, so that the processor of computers or the other programmable data processing methods may execute the scheme specified by block or multiple blocks of the disclosed structural diagrams and/or block diagrams and/or flow diagrams of the present disclosure.

Those skilled in the art may understand that various operations, methods, and steps, measures, and solutions in the processes that have been discussed in the present disclosure may be alternated, modified, combined, or removed. Further, other steps, measures, and solutions that include the operations, methods, and processes that have been discussed in this disclosure can also be alternated, modified, rearranged, decomposed, combined, or removed. Further, that various operations, methods, and steps, measures, and solutions in the processes disclosed in this disclosure in the existing art may also be alternated, modified, rearranged, decomposed, combined, or removed.

The above description is only part of the embodiments of the present disclosure, it should be noted that for those of ordinary skill in the art, without departing from the principles of the present disclosure, improvements and modifications may be made, and these improvements and modification also should be regarded as the protection scope of the present disclosure.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a communication system, the method comprising:
   receiving, from a base station, a first control message including first configuration information on a plurality of message 3 (msg3) transmissions, second configuration information on an uplink (UL) or downlink (DL) configuration, third configuration information on a synchronization signal block (SSB), fourth configuration information including a plurality of redundancy versions (RVs) for the plurality of msg3 transmissions, and fifth configuration information including a plurality of transmission beams for the plurality of msg3 transmissions, wherein the plurality of RVs are different from each other and the plurality of transmission beams are different from each other;
   transmitting, to the base station, a random access preamble;
   receiving, from the base station, a random access response (RAR) associated with the random access preamble;
   identifying a first resource for the plurality of msg3 transmissions based on the RAR and the first control message, wherein the first resource does not include a symbol indicated as a downlink by the second configuration information or a symbol indicated by the third configuration information to which the SSB is to be received; and
   transmitting, to the base station, the plurality of msg3 transmissions based on the plurality of RVs, wherein the plurality of msg3 transmissions correspond to multiple repeated transmissions of a plurality of physical uplink shared channels (PUSCH) transmissions,
wherein the plurality of RVs are sequentially applied to the plurality of PUSCH transmissions, and a common RV is applied to multiple repeated transmissions in each of the plurality of PUSCH transmissions,
wherein different transmission beams are applied to each of the multiple repeated transmissions in each of the plurality of PUSCH transmissions and a common transmission beam pattern across the multiple repeated transmissions in each of the plurality of PUSCH transmissions is applied to each of the plurality of PUSCH transmissions, and
wherein the common transmission beam pattern corresponds to each of the plurality of transmission beams being applied to the multiple repeated transmissions in each of the plurality of PUSCH transmissions in a common order for the plurality of PUSCH transmissions.

2. The method of claim 1, further comprising:
receiving, from the base station, a second control message for msg3 retransmission with repetition;
identifying a second resource for the msg3 retransmission based on the second control message and the first control message, wherein the second resource does not include the symbol indicated as the downlink by the second configuration information or the symbol indicated by the third configuration information to which the SSB is to be transmitted; and
transmitting, to the base station, the msg3 retransmission based on the second resource.

3. The method of claim 2, wherein the first control message is a system information block message, and the second control message is downlink control information (DCI).

4. The method of claim 2, wherein the RAR or the second control message includes time resource allocation information and frequency resource allocation information.

5. A method performed by a base station in a communication system, the method comprising:
transmitting, to a terminal, a first control message including first configuration information on a plurality of message 3 (msg3) transmissions, second configuration information on an uplink (UL) or downlink (DL) configuration, third configuration information on a synchronization signal block (SSB), fourth configuration information including a plurality of redundancy versions (RVs) for the plurality of msg3 transmissions, and fifth configuration information including a plurality of transmission beams for the plurality of msg3 transmissions, wherein the plurality of RVs are different from each other and the plurality of transmission beams are different from each other;
receiving, from the terminal, a random access preamble;
transmitting, to the terminal, a random access response (RAR) associated with the random access preamble; and
receiving, from the terminal, the plurality of msg3 transmissions based on a first resource, wherein the plurality of msg3 transmissions correspond to multiple repeated transmissions of a plurality of physical uplink shared channels (PUSCH) transmissions,
wherein the first resource is associated with the RAR and the first control message,
wherein the first resource does not include a symbol indicated as a downlink by the second configuration information or a symbol indicated by the third configuration information to which the SSB is to be transmitted,
wherein the plurality of RVs are sequentially indicated for the plurality of msg3 transmissions, and a common RV is indicated for multiple repeated transmissions in each of the plurality of PUSCH transmissions,
wherein different transmission beams are indicated for each of the multiple repeated transmissions in each of the PUSCH transmissions and a common transmission beam pattern across the multiple repeated transmissions in each of the plurality of PUSCH transmissions is indicated for each of the plurality of PUSCH transmissions, and
wherein the common transmission beam pattern corresponds to each of the plurality of transmission beams being applied to the multiple repeated transmissions in each of the plurality of PUSCH transmissions in a common order for the plurality of PUSCH transmissions.

6. The method of claim 5, further comprising:
transmitting, to the terminal, a second control message for msg3 retransmission with repetition; and
receiving, from the terminal, the msg3 retransmission based on a second resource,
wherein the second resource is associated with the second control message and the first control message, and
wherein the second resource does not include the symbol indicated as the downlink by the second configuration information or the symbol indicated by the third configuration information to which the SSB is to be transmitted.

7. The method of claim 6, wherein the first control message is a system information block message and the second control message is downlink control information (DCI).

8. The method of claim 6, wherein the RAR or the second control message includes time resource allocation information and frequency resource allocation information.

9. A terminal in a communication system, the terminal comprising:
a transceiver; and
a processor coupled with the transceiver and configured to:
receive, from a base station, a first control message including first configuration information on a plurality of message 3 (msg3) transmissions, second configuration information on an uplink (UL) or downlink (DL) configuration, third configuration information on a synchronization signal block (SSB), fourth configuration information including a plurality of redundancy versions (RVs) for the plurality of msg3 transmissions, and fifth configuration information including a plurality of transmission beams for the plurality of msg3 transmissions, wherein the plurality of RVs are different from each other and the plurality of transmission beams are different from each other;
transmit, to the base station, a random access preamble;
receive, from the base station, a random access response (RAR) associated with the random access preamble;
identify a first resource for the plurality of msg3 transmissions based on the RAR and the first control message, wherein the first resource does not include a symbol indicated as a downlink by the second configuration information or a symbol indicated by the third configuration information to which the SSB is to be received; and transmit, to the base station, the plurality of msg3 transmissions based on the plurality of RVs, wherein the plurality of msg3 transmissions correspond to multiple repeated transmissions of a plurality of physical uplink shared channels (PUSCH) transmissions, wherein the plurality of RVs are sequentially applied to the plurality of PUSCH transmissions, and a common RV is applied to multiple repeated transmissions in each of the plurality of PUSCH transmissions, wherein different transmission beams are applied to each of the multiple repeated transmissions in each of the plurality of PUSCH transmissions and a common transmission beam pattern across the multiple repeated transmissions in each of the plurality of PUSCH transmissions is applied to each of the plurality of PUSCH transmissions, and wherein the common transmission beam pattern corresponds to each of the plurality of transmission beams being applied to the multiple repeated transmissions in each of the plurality of PUSCH transmissions in a common order for the plurality of PUSCH transmissions.

10. The terminal of claim 9, wherein the first control message is a system information block message, and the second control message is downlink control information (DCI).

11. The terminal of claim 9, wherein the RAR or the second control message includes time resource allocation information and frequency resource allocation information.

12. A base station in a communication system, the base station comprising:

a transceiver; and a processor coupled with the transceiver and configured to:

transmit, to a terminal, a first control message including first configuration information on a plurality of message 3 (msg3) transmissions, second configuration information on an uplink (UL) or downlink (DL) configuration, third configuration information on a synchronization signal block (SSB), fourth configuration information including a plurality of redundancy versions (RVs) for the plurality of msg3 transmissions, and fifth configuration information including a plurality of transmission beams for the plurality of msg3 transmissions, wherein the plurality of RVs are different from each other and the plurality of transmission beams are different from each other;

receive, from the terminal, a random access preamble;

transmit, to the terminal, a random access response (RAR) associated with the random access preamble; and receive, from the terminal, the plurality of msg3 transmissions based on a first resource, wherein the plurality of msg3 transmissions correspond to multiple repeated transmissions of a plurality of physical uplink shared channels (PUSCH) transmissions, wherein the first resource is associated with the RAR and the first control message, wherein the first resource does not include a symbol indicated as a downlink by the second configuration information or a symbol indicated by the third configuration information to which the SSB is to be transmitted, wherein the plurality of RVs are sequentially indicated for the plurality of msg3 transmissions, and a common RV is indicated for multiple repeated transmissions in each of the plurality of PUSCH transmissions, wherein different transmission beams are indicated for each of the multiple repeated transmissions in each of the plurality of PUSCH transmissions and a common transmission beam pattern across the multiple repeated transmissions in each of the plurality of PUSCH transmissions is indicated for each of the plurality of PUSCH transmissions, and wherein the common transmission beam pattern corresponds to each of the plurality of transmission beams being applied to the multiple repeated transmissions in each of the plurality of PUSCH transmissions in a common order for the plurality of PUSCH transmissions.

13. The base station of claim 12, wherein the processor is further configured to:

transmit, to the terminal, a second control message for msg3 retransmission with repetition; and receive, from the terminal, the msg3 retransmission based on a second resource, wherein the second resource is associated with the second control message and the first control message, and wherein the second resource does not include the symbol indicated as the downlink by the second configuration information or the symbol indicated by the third configuration information to which the SSB is to be transmitted.

14. The base station of claim 13, wherein the first control message is a system information block message and the second control message is downlink control information (DCI), and wherein the RAR or the second control message includes time resource allocation information and frequency resource allocation information.

* * * * *